(12) United States Patent
Zawada et al.

(10) Patent No.: US 9,721,369 B2
(45) Date of Patent: Aug. 1, 2017

(54) SYSTEMS AND METHODS FOR UTILIZING MULTIPLE MAP PORTIONS FROM MULTIPLE MAP DATA SOURCES

(71) Applicant: Facebook, Inc., Menlo Park, CA (US)

(72) Inventors: Tomasz Zawada, San Francisco, CA (US); Jason Michael Carreiro, Mansfield, MA (US); Saurav Mohapatra, Lexington, MA (US); Kunal Bhalla, Menlo Park, CA (US); Kuan-Yu Tseng, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/855,096

(22) Filed: Sep. 15, 2015

(65) Prior Publication Data

US 2017/0076473 A1 Mar. 16, 2017

(51) Int. Cl.
*G06T 7/00* (2017.01)
*G06K 9/62* (2006.01)
*G06T 11/60* (2006.01)

(52) U.S. Cl.
CPC .............. *G06T 11/60* (2013.01); *G06K 9/62* (2013.01); *G06T 7/00* (2013.01)

(58) Field of Classification Search
CPC ................................................... G06T 7/0034
See application file for complete search history.

(56) References Cited

U.S. PATENT DOCUMENTS

| 2008/0098090 | A1  | 4/2008  | Geraci et al.       |                 |
|--------------|-----|---------|---------------------|-----------------|
| 2009/0210388 | A1* | 8/2009  | Elson ............... | G06F 17/30241   |
| 2010/0013673 | A1  | 1/2010  | Blais               |                 |
| 2010/0097402 | A1* | 4/2010  | Aylett ............... | G09B 29/10     |
|              |     |         |                     | 345/676         |
| 2010/0299370 | A1* | 11/2010 | Otto .................. | G01C 21/32     |
|              |     |         |                     | 707/803         |
| 2013/0328861 | A1  | 12/2013 | Arikan et al.       |                 |
| 2014/0372032 | A1  | 12/2014 | Canner et al.       |                 |
| 2015/0052149 | A1  | 2/2015  | Hiestermann et al.  |                 |

OTHER PUBLICATIONS

U.S. Appl. No. 14/466,269, filed Aug. 22, 2014.
International Application No. PCT/US2015/050508, International Search Report and Written Opinion mailed Dec. 21, 2015.

* cited by examiner

*Primary Examiner* — Matthew Salvucci
(74) *Attorney, Agent, or Firm* — Sheppard, Mullin, Richter & Hampton LLP

(57) ABSTRACT

Systems, methods, and non-transitory computer-readable media can acquire a request for a map of a particular region. A first set of one or more map portions for representing a first portion of the particular region can be identified based on the particular region. The first set can be associated with a first map data source. A second set of one or more map portions for representing a second portion of the particular region can be identified based on the particular region. The second set can be associated with a second map data source. The map of the particular region can be generated based on a combination of the first set and the second set.

17 Claims, 11 Drawing Sheets

SYSTEMS AND METHODS FOR UTILIZING MULTIPLE MAP PORTIONS FROM MULTIPLE MAP DATA SOURCES

FIELD OF THE INVENTION

The present technology relates to the field of electronic mapping. More particularly, the present technology relates to techniques for utilizing multiple map portions from multiple map data sources.

BACKGROUND

Today, people often utilize computing devices (or systems) for a wide variety of purposes. Users can use their computing devices to, for example, interact with one another, access content, share content, and create content. In some cases, users can utilize their computing devices to download, view, access, or otherwise interact with maps, such as digital or electronic maps. For instance, users of a social networking system (or service) can, via their computing devices, access maps by browsing information about places or by checking in at various places.

Under conventional approaches rooted in computer technology, a map is generally created or rendered based on map data acquired from a given map data source or provider. In one example, a user of a computing device can navigate to a web resource (or website) to access a map, which can be provided by a single entity associated with the web resource. In another example, the user can download and run an application (or app) that presents a map, which can be provided by another entity associated with the application. However, in accordance with conventional approaches to providing maps, a given map data source may provide satisfactory map data for one region or location, but may not be able to provide satisfactory map data for another region or location. As such, conventional approaches can create challenges for or reduce the overall experience associated with utilizing maps.

SUMMARY

Various embodiments of the present disclosure can include systems, methods, and non-transitory computer readable media configured to acquire a request for a map of a particular region. A first set of one or more map portions for representing a first portion of the particular region can be identified based on the particular region. The first set can be associated with a first map data source. A second set of one or more map portions for representing a second portion of the particular region can be identified based on the particular region. The second set can be associated with a second map data source. The map of the particular region can be generated based on a combination of the first set and the second set.

In an embodiment, identifying, based on the particular region, the first set can further comprise calculating a first map similarity score based on comparing the first set with one or more recognized map portions associated with a recognized map data source. The one or more recognized map portions can represent the first portion of the particular region. A second map similarity score can be calculated based on comparing a third set of one or more map portions with the one or more recognized map portions. The third set can represent the first portion of the particular region. The first set can be selected instead of the third set when the first map similarity score is greater than the second map similarity score.

In an embodiment, calculating the first map similarity score based on comparing the first set with the one or more recognized map portions can further comprise acquiring a first collection of map features from the first set. A second collection of map features can be acquired from the one or more recognized map portions. A level of similarity can be determined between the first collection of map features and the second collection of map features. The first map similarity score can be based on the level of similarity.

In an embodiment, at least one of the first collection or the second collection can include at least one of a road feature, a water feature, a landform feature, a landmark feature, or a border feature.

In an embodiment, the first set can be preset to be identified for representing the first portion of the particular region.

In an embodiment, at least one map portion in the first set can be acquired, for generating the map, at a same time as at least one map portion in the second set.

In an embodiment, a first style associated with the first set and a second style associated with the second set can be modified such that the first style matches, within an allowable deviation, the second style.

In an embodiment, one or more first graphical qualities of at least some map portions in the first set can be blended with one or more second graphical qualities of at least some map portions in the second set.

In an embodiment, first attribution information for the first set and second attribution information for the second set can be dynamically provided. At least one of the first attribution information or the second attribution information can be associated with at least one of a logo, a mark, or a copyright.

In an embodiment, the request can further include at least one of current location information or language information. The at least one of the current location information or the language information can be associated with a device that provides the request. At least one of the first set or the second set can be identified further based on the at least one of the current location information or the language information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
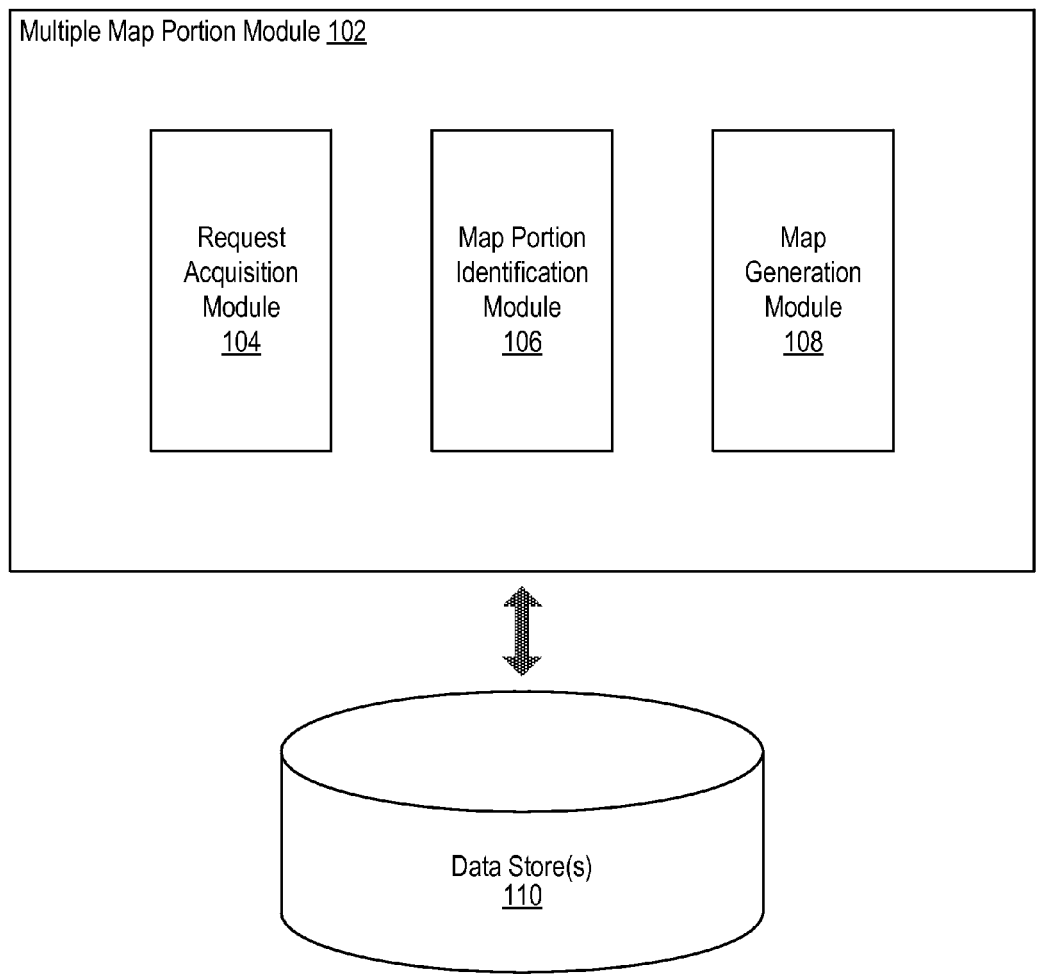
FIG. 1 illustrates an example system including an example multiple map portion module configured to facilitate utilizing multiple map portions from multiple map data sources, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Utilizing Multiple Map Portions from Multiple Map Data Sources

People use computing systems (or devices) for various purposes. Users can utilize their computing systems to establish connections, engage in communications, interact with one another, and/or interact with various types of content. In some cases, a user of a computing device can utilize maps, such as digital or electronic maps. For example, the user can utilize his or her computing device to navigate to a social networking system (or service) and to access maps provided via the social networking system, such as when browsing pages of places and/or when checking in at various places. In another example, the user can access maps provided via a mapping web resource. In a further example, the user can access maps provided via a mapping application.

Conventional approaches rooted in computer technology generally involve utilizing a particular map data source to provide map data and then generating a map based on the map data from the particular map data source. However, under conventional approaches to utilizing maps, the map generated based on the map data provided by the particular map data source can, in many cases, lack sufficient detail, accuracy, or comprehensiveness for representing one or more particular regions or locations. Accordingly, such conventional approaches can be inefficient, ineffective, or inconvenient for providing maps.

Due to these or other concerns, conventional approaches can be disadvantageous or problematic. Therefore, an improved approach can be beneficial for addressing or alleviating various drawbacks associated with conventional approaches. Based on computer technology, the disclosed technology can utilize multiple map portions (i.e., map tiles, map squares, map rectangles, map polygons, etc.) from multiple map data sources. Various embodiments of the present disclosure can acquire a request for a map of a particular region. A first set of one or more map portions for representing a first portion of the particular region can be identified based on the particular region. The first set can be associated with a first map data source. A second set of one or more map portions for representing a second portion of the particular region can be identified based on the particular region. The second set can be associated with a second map data source. The map of the particular region can be generated based on a combination of the first set and the second set. It is contemplated that there can be many variations and/or other possibilities associated with the disclosed technology.

FIG. 1 illustrates an example system 100 including an example multiple map portion module 102 configured to facilitate utilizing multiple map portions from multiple map data sources, according to an embodiment of the present disclosure. As shown in the example of FIG. 1, the multiple map portion module 102 can include a request acquisition module 104, a map portion identification module 106, and a map generation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the multiple map portion module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the multiple map portion module 102 can be implemented, in part or in whole, as software running on one or more computing devices or systems, such as on a user or client computing device. For example, the multiple map portion module 102 or at least a portion thereof can be implemented as or within an application (e.g., app), a program, an applet, or an operating system, etc., running on a user computing device or a client computing system, such as the user device 710 of FIG. 7. In another example, the multiple map portion module 102 or at least a portion thereof can be implemented using one or more computing devices or systems that include one or more servers, such as network servers or cloud servers. In some instances, the multiple map portion module 102 can, in part or in whole, be implemented within or configured to operate in conjunction with a social networking system (or service), such as the social networking system 730 of FIG. 7. It should be understood that there can be many variations or other possibilities.

The request acquisition module 104 can be configured to facilitate acquiring a request for a map of a particular region. In some cases, the request acquisition module 104 can be configured to receive, fetch, or otherwise acquire the request for the map of the particular region from a computing device (or system), such as the user device 710 and/or at least one server of the social networking system 730 of FIG. 7. In one example, the computing device can request the map of the particular region when attempting to load or render the map of the particular region. In another example, the computing device can request the map of the particular region when the computing device receives or detects a user command or user interaction (e.g., a scroll operation, a zoom operation, etc.) that causes the map to shift or zoom to the particular region. It should be understood that all examples herein are provided for illustrative purposes and that many variations are possible.

In some embodiments, the request can further include at least one of current location information or language information. The at least one of the current location information or the language information can be associated with a device that provides the request, such as the user device 710. In some implementations, the map for the particular region can be generated based on information included in the request, such as based on at least one of the current location information or the language information. For example, if the particular region includes disputed borders, then the map of the particular region can be generated to include a suitable depiction of the borders based on the current location of the device. In another example, if the language information indicates a preference for a particular language and if the map of the particular region includes text (e.g., names of cities, territories, roads, etc.), then the map of the particular region can be generated to include the text in the particular language. Many variations are possible.

The map portion identification module 106 can be configured to facilitate identifying, based on the particular region, a first set of one or more map portions for representing a first portion of the particular region. The first set can be associated with a first map data source. The map portion identification module 106 can also be configured to facilitate identifying, based on the particular region, a second set of one or more map portions for representing a second portion of the particular region. The second set can be associated with a second map data source. In some instances, at least one of the first set or the second set can be identified further based on information included in the request, such as current location information and/or language information. The map portion identification module 106 will be discussed in more detail below with reference to FIG. 2A.

Moreover, the map generation module 108 can be configured to facilitate generating the map of the particular region based on a combination of the first set and the second set. In some cases, the map generation module 108 can utilize the first set to generate the first region and can utilize the second set to generate the second region. More details regarding the map generation module 108 will be provided below with reference to FIG. 2B.

Furthermore, in some embodiments, the multiple map portion module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the multiple map portion module 102. Again, it is contemplated that there can be many variations or other possibilities.

Figure 2A:
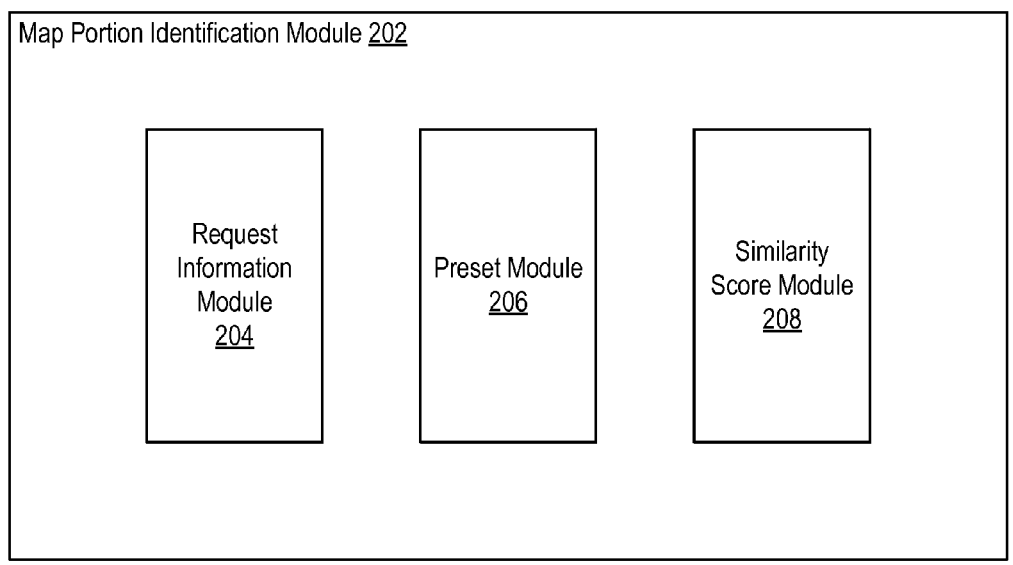
FIG. 2A illustrates an example map portion identification module configured to facilitate utilizing multiple map portions from multiple map data sources, according to an embodiment of the present disclosure.

FIG. 2A illustrates an example map portion identification module 202 configured to facilitate utilizing multiple map portions from multiple map data sources, according to an embodiment of the present disclosure. In some embodiments, the map portion identification module 106 of FIG. 1 can be implemented as the example map portion identification module 202. As shown in FIG. 2A, the map portion identification module 202 can include a request information module 204, a preset module 206, and a similarity score module 208.

As discussed previously, the map portion identification module 202 can be configured to facilitate identifying, based on a particular region of a map for which a request is made, a first set of one or more map portions for representing a first portion of the particular region. The first set can be associated with a first map data source. The map portion identification module 202 can also be configured to facilitate identifying, based on the particular region, a second set of one or more map portions for representing a second portion of the particular region. The second set can be associated with a second map data source. The map portion identification module 202 can utilize the request information module 204 to receive, fetch, parse, or otherwise acquire information included in the request, such as information about the particular region, current location information, and/or language information. Accordingly, the first set and/or the second set can be identified based on such information included in the request and acquired by the request information module 204.

The first set can be identified based on determining that the first set provides at least a specified threshold level of detail, accuracy, and/or comprehensiveness for representing the first portion of the particular region. Similarly, the second set can be identified based on determining that the second set provides at least the specified threshold level of detail, accuracy, and/or comprehensiveness for representing the second portion of the particular region. In some cases, the map portion identification module 202 can utilize the preset module 206 to preset (e.g., manually define) the first set to be identified for representing the first portion of the particular region, where the first set has been determined or deemed to be detailed, accurate, comprehensive, and/or otherwise suitable for representing the first portion. In some instances, the preset module 206 can also preset the second set to be identified for representing the second portion of the particular region, where the second set has been determined or deemed to be accurate, comprehensive, and/or otherwise suitable for representing the second portion. In one example, the preset module 206 can generate and store a first mapping between the first portion of the particular region and the first set. In this example, the preset module 206 can also generate and store a second mapping between the second portion of the particular region and the second set. When the request is for the map of the particular region which includes the first portion and the second portion, the first set and the second set can be preset to be respectively identified. It is contemplated that there can be many variations or other possibilities associated with the disclosed technology. For example, the disclosed technology can be utilized with any suitable quantity of sets of map portions and any suitable quantity of portions of various requested regions.

Additionally, in some embodiments, the map portion identification module 202 can, for instance, utilize the similarity score module 208 to calculate a first map similarity score based on comparing the first set with one or more recognized map portions associated with a recognized map data source. The one or more recognized map portions can represent the first portion of the particular region. The recognized map data source can, in some cases, correspond to a predefined, trusted, and/or verified map data source that represents the ground truth. The similarity score module 208 can also calculate a second map similarity score based on comparing a third set of one or more map portions with the one or more recognized map portions. The third set can represent the first portion of the particular region. The map portion identification module 202 can select (or identify) the first set instead of the third set when the first map similarity score is greater than the second map similarity score.

Similarly, in some implementations, the map portion identification module 202 can, for example, utilize the similarity score module 208 to calculate a third map similarity score based on comparing the second set with one or more other recognized map portions associated with the recognized map data source. The one or more other recognized map portions can represent the second portion of the particular region. The similarity score module 208 can also calculate a fourth map similarity score based on comparing a fourth set of one or more map portions with the one or more other recognized map portions. The fourth set can represent the second portion of the particular region. The map portion identification module 202 can select (or identify) the second set instead of the fourth set when the third map similarity score is greater than the fourth map similarity score. As discussed, it should be appreciated that many variations are possible.

Moreover, in some embodiments, calculating the first map similarity score based on comparing the first set with the one or more recognized map portions can further comprise acquiring a first collection of map features from the first set. A second collection of map features can also be acquired from the one or more recognized map portions. The similarity score module 208 can determine a level of similarity between the first collection of map features and the second collection of map features. The first map similarity score can be based on the level of similarity. In some cases, at least one of the first collection or the second collection can include at least one of a road feature, a water feature, a landform feature, a landmark feature, or a border feature, etc.

Likewise, calculating the third map similarity score based on comparing the second set with the one or more other recognized map portions can further comprise acquiring a third collection of map features from the second set. A fourth collection of map features can also be acquired from the one or more other recognized map portions. The similarity score module 208 can determine another level of similarity between the third collection of map features and the fourth collection of map features. The third map similarity score can be based on this other level of similarity. In some instances, at least one of the third collection or the fourth collection can include at least one of a road feature, a water feature, a landform feature, a landmark feature, or a border feature, etc. Again, many variations are possible.

Figure 2B:
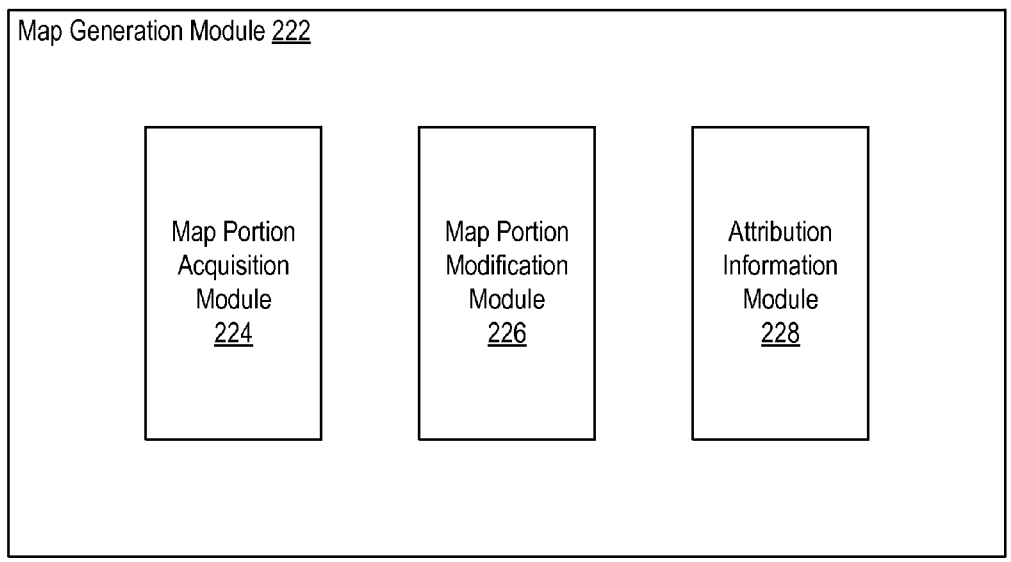
FIG. 2B illustrates an example map generation module configured to facilitate utilizing multiple map portions from multiple map data sources, according to an embodiment of the present disclosure.

FIG. 2B illustrates an example map generation module 222 configured to facilitate utilizing multiple map portions from multiple map data sources, according to an embodiment of the present disclosure. In some embodiments, the map generation module 108 of FIG. 1 can be implemented as the example map generation module 222. As shown in FIG. 2B, the map generation module 222 can include a map portion acquisition module 224, a map portion modification module 226, and an attribution information module 228.

As discussed above, the map generation module 222 can be configured to facilitate generating a map of a particular region based on a combination of a first set of one or more map portions and a second set of one or more map portions. In some embodiments, the map generation module 222 can utilize the map portion acquisition module 224 to concurrently fetch, received, or otherwise acquire the first set and the second set. In one instance, at least one map portion in the first set can be acquired, for generating the map, at a same time (e.g., at least temporarily simultaneously) as at least one map portion in the second set.

Moreover, in some implementations, the map generation module 222 can utilize the map portion modification module 224 to modify a first style (e.g., appearance) associated with the first set and a second style associated with the second set such that the first style matches, within an allowable deviation, the second style (and vice versa). In some cases, the map portion modification module 224 can also blend (e.g., mix, fade, blur, etc.) one or more first graphical qualities (e.g., color, brightness, locations of landforms, locations of roads, etc.) of at least some map portions in the first set with one or more second graphical qualities of at least some map portions in the second set.

Furthermore, in some embodiments, the map generation module 222 can utilize the attribution information module 228 to dynamically provide first attribution information for the first set and second attribution information for the second set. In some cases, at least one of the first attribution information or the second attribution information can be associated with at least one of a logo, a mark, or a copyright. Again, there can be many variations or other possibilities associated with the disclosed technology.

Figure 3A:
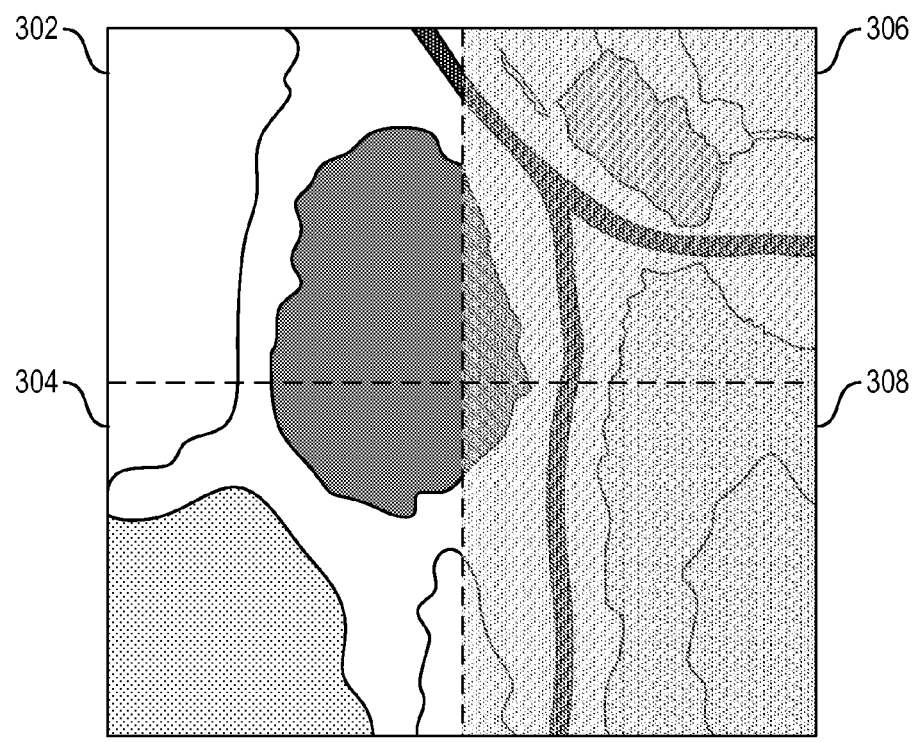
FIG. 3A illustrates an example scenario associated with utilizing multiple map portions from multiple map data sources, according to an embodiment of the present disclosure.

FIG. 3A illustrates an example scenario 300 associated with utilizing multiple map portions from multiple map data sources, according to an embodiment of the present disclosure. In the example scenario 300 of FIG. 3A, there can be an example map for a particular region generated based on a first set of map portions (e.g., map portions 302 and 304) and a second set of map portions (e.g., map portions 306 and 308).

In the example scenario 300, the first set of map portions 302 and 304 acquired from a first map data source is utilized to represent a first portion of the particular region, while the second set of map portions 306 and 308 acquired from a second map data source is utilized to represent a second portion of the particular region. In this example, the first set of map portions 302 and 304 can be selected and identified as being suitable, optimal, and/or otherwise appropriate for representing the first portion. Moreover, the second map data source (or a third map data source, etc.) can possess or have access to another set of map portions that represents the first portion, but in this example, the other set of map portions has been determined or deemed to be not as suitable and/or appropriate for representing the first portion as the first set. Likewise, in this example, the second set of map portions 306 and 308 can be selected and identified as being suitable, optimal, and/or otherwise appropriate for representing the second portion. Furthermore, the first map data source (or the third map data source, etc.) can possess or have access to a different set of map portions that represents the second portion, but in this example, the different set of map portions has been determined or deemed to be not as suitable and/or appropriate for representing the second portion as the second set. There can be many variations or other possibilities associated with the disclosed technology.

Figure 3B:
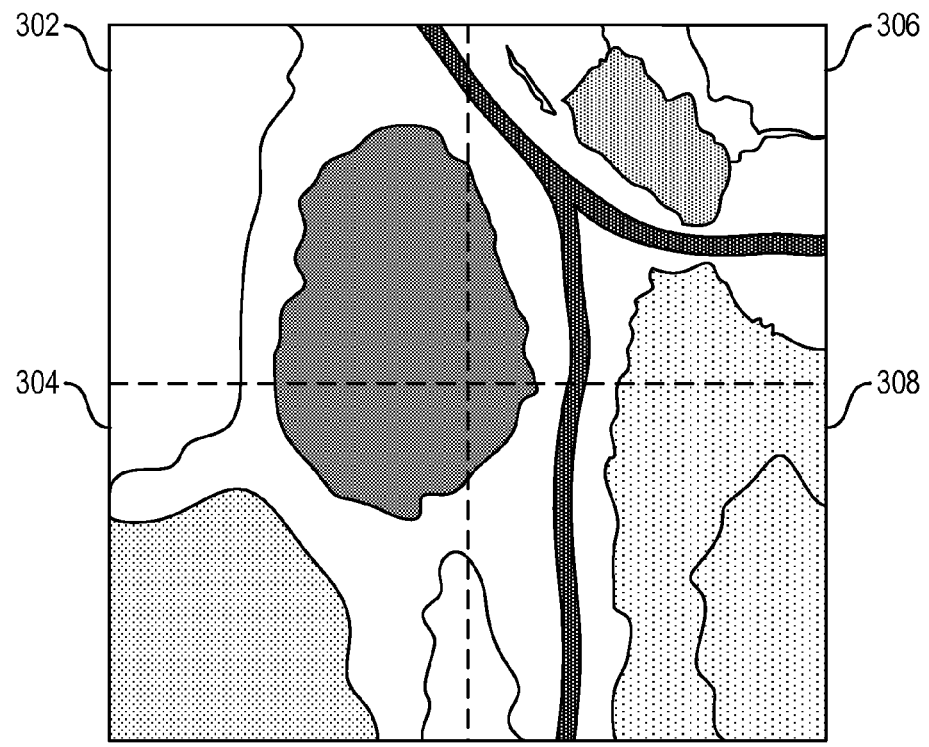
FIG. 3B illustrates an example scenario associated with utilizing multiple map portions from multiple map data sources, according to an embodiment of the present disclosure.

FIG. 3B illustrates an example scenario 320 associated with utilizing multiple map portions from multiple map data sources, according to an embodiment of the present disclosure. The example scenario 320 of FIG. 3B illustrates the example scenario 300 of FIG. 3A subsequent to having modified at least one of the first set (e.g., map portions 302 and 304) or the second set (e.g., map portions 306 and 308) to match one another in style and/or appearance within an allowable deviation. As shown in the example scenario 320 of FIG. 3B, the disclosed technology can modify a first style (or appearance) associated with the first set and/or a second style (or appearance) associated with the second set such that the first style matches, within the allowable deviation, the second style. Again, it should be appreciated that all examples herein are provided for illustrative purposes and that there can be many variations or other possibilities.

Figure 4A:
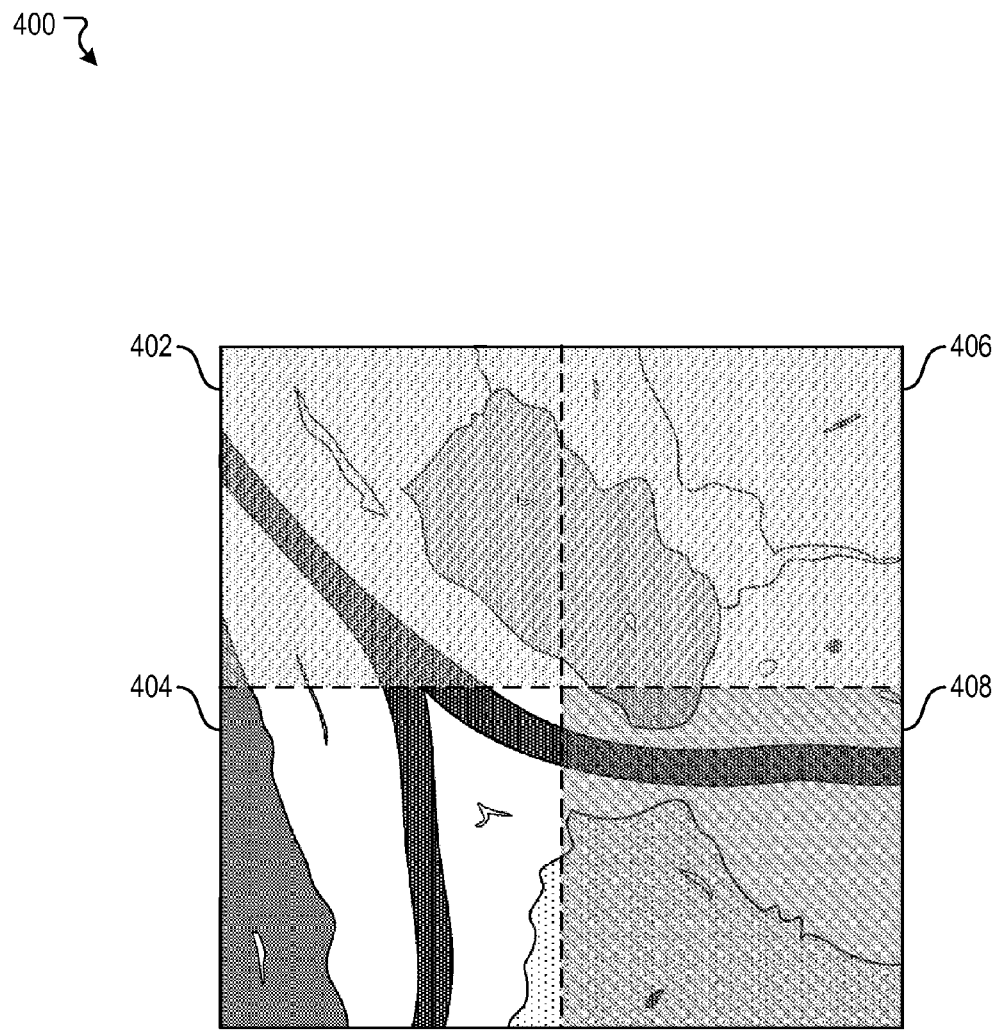
FIG. 4A illustrates an example scenario associated with utilizing multiple map portions from multiple map data sources, according to an embodiment of the present disclosure.

FIG. 4A illustrates an example scenario 400 associated with utilizing multiple map portions from multiple map data sources, according to an embodiment of the present disclosure. In the example scenario 400 of FIG. 4A, there can be an example map for a particular region. The particular region can be a zoomed-in version of the map portion 306 of FIG. 3A or FIG. 3B.

As shown in the example scenario 400 of FIG. 4A, the map for the particular region can be generated based on a first set of one or more map portions (e.g., map portions 402 and 406), a second set of one or more map portions (e.g., map portion 404), and a third set of one or more map portions (e.g., map portion 408). In the example scenario 400, the first set can be identified as being suitable, optimal, and/or otherwise appropriate for representing a first portion of the particular region, the second set can be identified as being suitable, optimal, and/or otherwise appropriate for representing a second portion of the particular region, and the third set can be identified as being suitable, optimal, and/or otherwise appropriate for representing a third portion of the particular region. It is contemplated that there can be many variations or other possibilities associated with the disclosed technology.

Figure 4B:
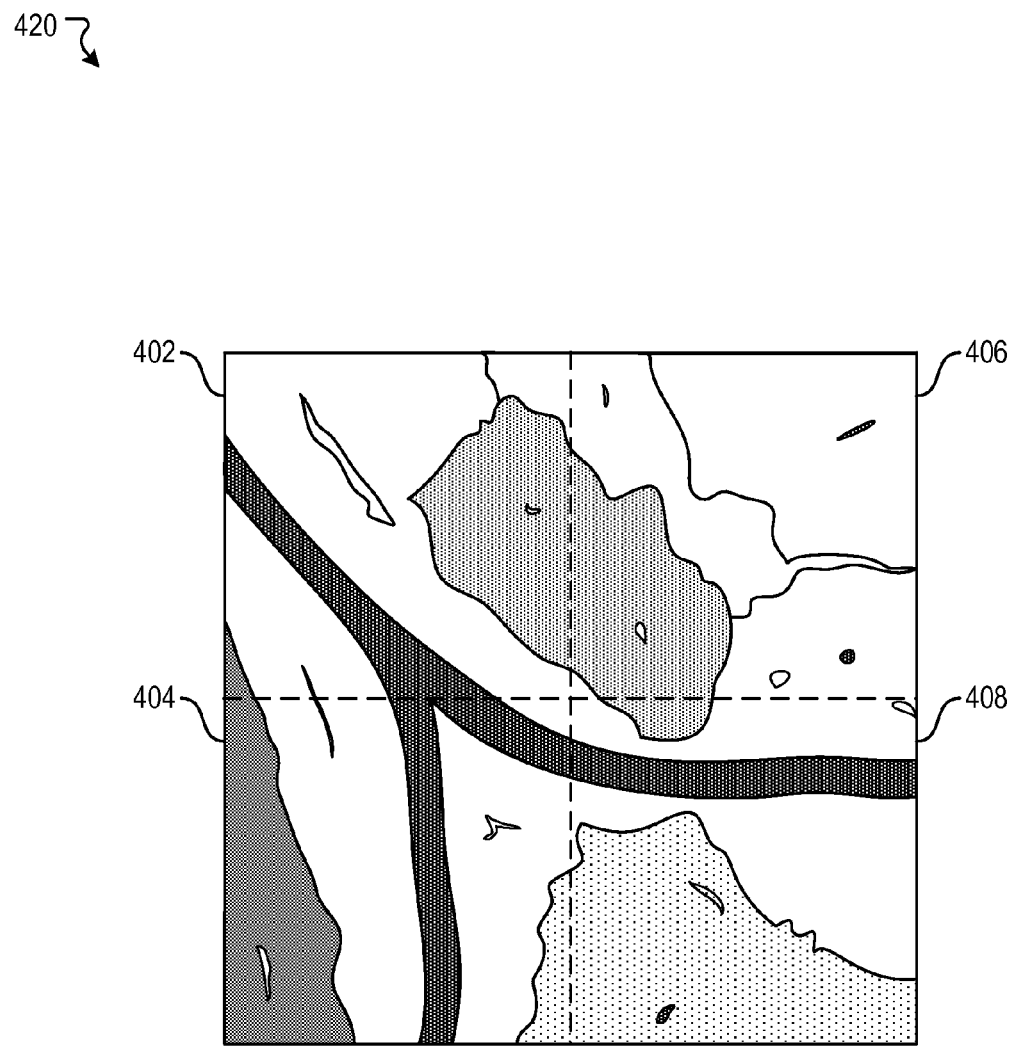
FIG. 4B illustrates an example scenario associated with utilizing multiple map portions from multiple map data sources, according to an embodiment of the present disclosure.

FIG. 4B illustrates an example scenario 420 associated with utilizing multiple map portions from multiple map data sources, according to an embodiment of the present disclosure. The example scenario 420 of FIG. 4B illustrates the example scenario 400 of FIG. 4A subsequent to having modified at least one of the first set (e.g., map portions 402 and 406), the second set (e.g., map portion 404), or the third set (e.g., map portion 408) to match one another in style and/or appearance within an allowable deviation. As shown in the example scenario 420 of FIG. 4B, the disclosed technology can modify a first style (or appearance) associated with the first set, a second style (or appearance) associated with the second set, and/or a third style (or appearance) associated with the third set such that the first style, the second style, and/or the third style match one another within the allowable deviation. As discussed, it should be understood that all examples herein are provided for illustrative purposes and that many variations are possible.

Figure 5:
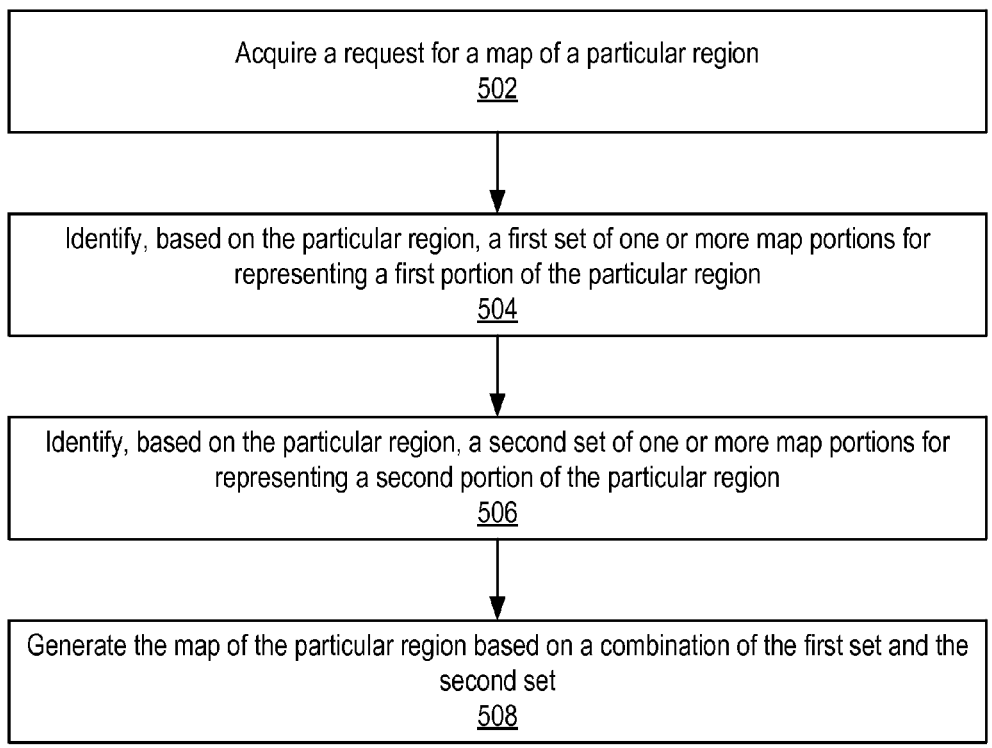
FIG. 5 illustrates an example method associated with utilizing multiple map portions from multiple map data sources, according to an embodiment of the present disclosure.

FIG. 5 illustrates an example method 500 associated with utilizing multiple map portions from multiple map data sources, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire a request for a map of a particular region. At block 504, the example method 500 can identify, based on the particular region, a first set of one or more map portions for representing a first portion of the particular region. The first set can be associated with a first map data source. At block 506, the example method 500 can identify, based on the particular region, a second set of one or more map portions for representing a second portion of the particular region. The second set can be associated with a second map data source. At block 508, the example method 500 can generate the map of the particular region based on a combination of the first set and the second set.

Figure 6:
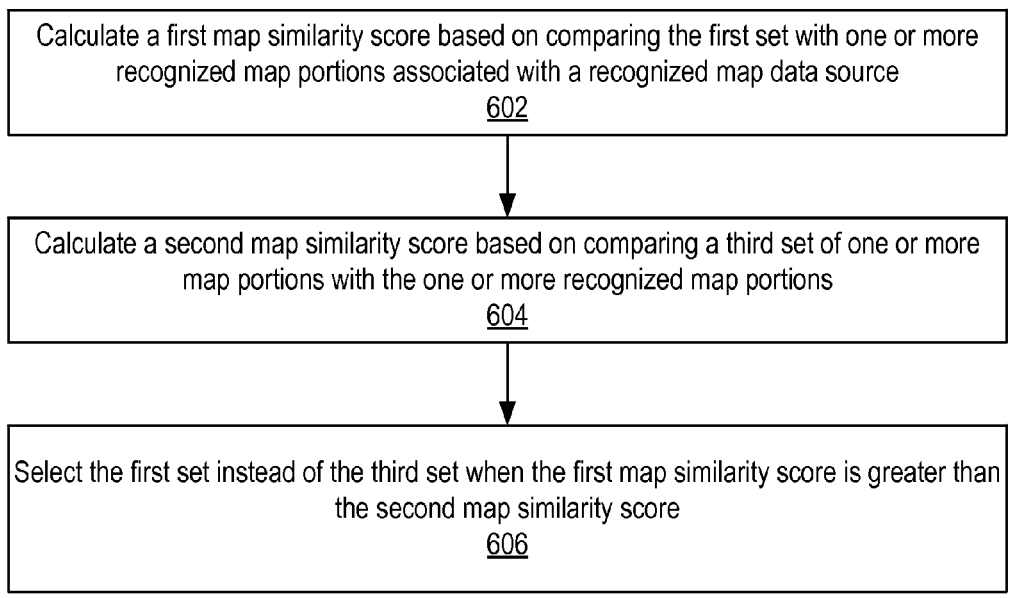
FIG. 6 illustrates an example method associated with utilizing multiple map portions from multiple map data sources, according to an embodiment of the present disclosure.

FIG. 6 illustrates an example method 600 associated with utilizing multiple map portions from multiple map data sources, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can calculate a first map similarity score based on comparing the first set with one or more recognized map portions associated with a recognized map data source. The one or more recognized map portions can represent the first portion of the particular region. At block 604, the example method 600 can calculate a second map similarity score based on comparing a third set of one or more map portions with the one or more recognized map portions. The third set can represent the first portion of the particular region. At block 606, the example method 600 can select the first set instead of the third set when the first map similarity score is greater than the second map similarity score.

It is contemplated that there can be many other uses, applications, features, possibilities, and/or variations associated with the various embodiments of the present disclosure. For example, in some embodiments, the disclosed technology can utilize a map, generated based on multiple map portions from multiple map data sources, to present a particular place (e.g., landmark, building, store, park, school, residence, point of interest, etc.). The disclosed technology can generate a bounding box (e.g., a virtual polygonal shape) representing the particular place based on third-party data (e.g., polygon data) and/or location data (e.g., check-in data for the particular place at various locations). Based on a size (height and width) of the bounding box for the particular place and based on a size (height and width) of a currently viewed/viewable map area, the disclosed technology can determine a default, preferred, suitable, or optimal zoom level for displaying the map of the particular place, such that the map of the particular place can center on the particular place while also displaying the bounding box in its entirety. Moreover, in some instances, the disclosed technology can provide multiple dynamic maps at a same time, such as via an interface with a first interface portion for providing a first dynamic map and with a second interface portion for proving a second dynamic map, and so forth. Furthermore, in some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
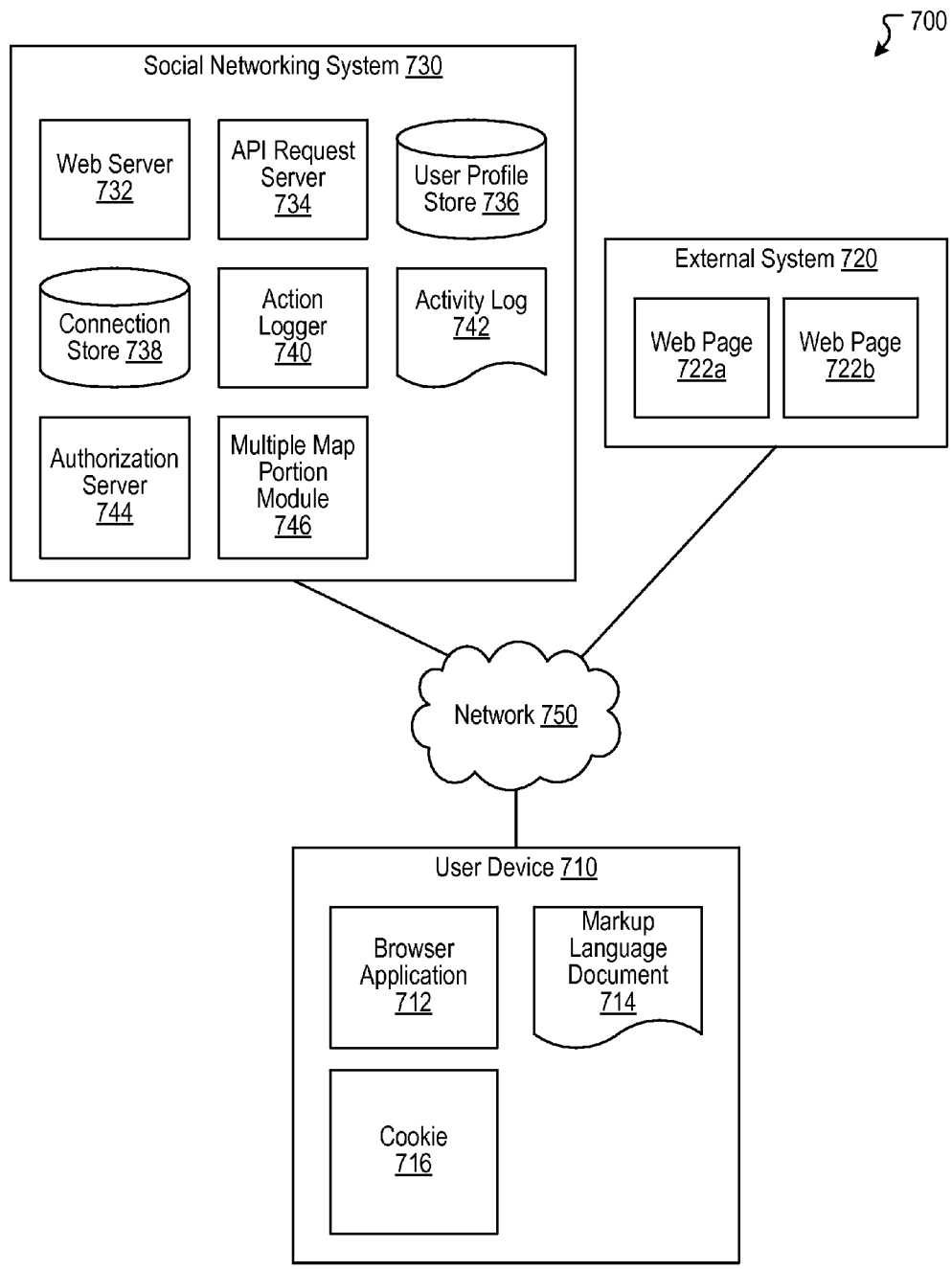
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet. In some embodiments, the social networking system 730 can include or correspond to a social media system (or service).

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a multiple map portion module 746. The multiple map portion module 746 can, for example, be implemented as the multiple map portion module 102 of FIG. 1. As discussed previously, it should be appreciated that there can be many variations or other possibilities. For example, in some instances, the multiple map portion module (or at least a portion thereof) can be included or implemented in the user device 710. Other features of the multiple map portion module 746 are discussed herein in connection with the multiple map portion module 102.

Hardware Implementation

Figure 8:
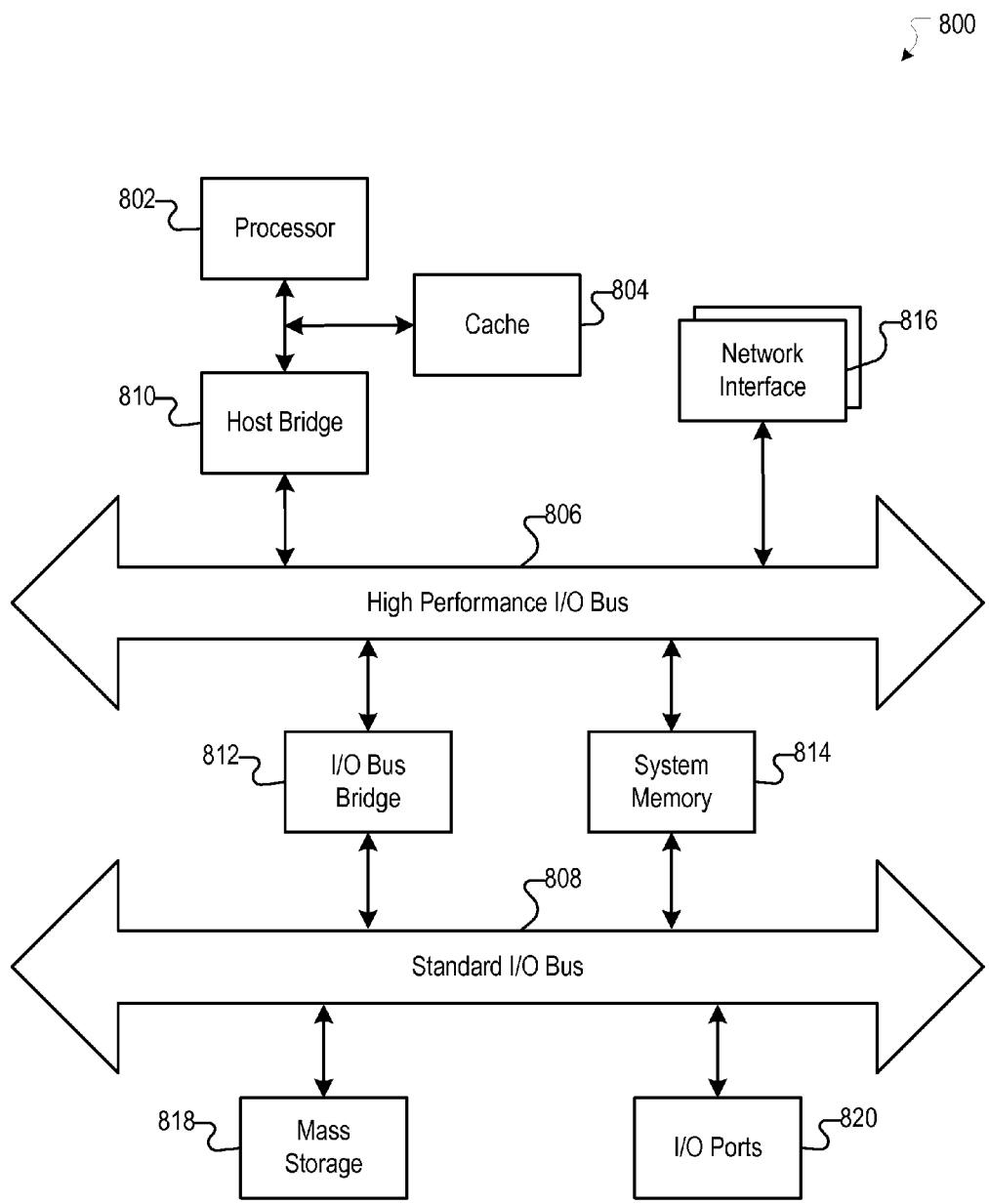
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a request for a map of a particular region;
   identifying, by the computing system, based on the particular region, a first set of one or more map portions for representing a first geographic portion of the particular region, the first set being associated with a first map data source;
   identifying, by the computing system, based on the particular region, a second set of one or more map portions for representing a second geographic portion of the particular region, the second set being associated with a second map data source;
   modifying at least one of a brightness or a color of the second set based on a brightness or a color of the first set; and
   generating, by the computing system, the map of the particular region based on a combination of the first set and the second set, wherein
   the first geographic portion represents a first geographic area within the particular region;
   the second geographic portion represents a second geographic area within the particular region that is adjacent to the first geographic area; and
   the identifying, based on the particular region, the first set of one or more map portions further comprises:
      calculating a first map similarity score based on comparing the first set of one or more map portions with one or more recognized map portions associated with a recognized map data source, the one or more recognized map portions representing the first geographic portion of the particular region;
      calculating a second map similarity score based on comparing a third set of one or more map portions with the one or more recognized map portions, the third set representing the first geographic portion of the particular region; and
      selecting the first set instead of the third set based on a determination that the first map similarity score is greater than the second map similarity score.

2. The computer-implemented method of claim 1, wherein calculating the first map similarity score based on comparing the first set with the one or more recognized map portions further comprises:
   acquiring a first collection of map features from the first set;
   acquiring a second collection of map features from the one or more recognized map portions; and
   determining a level of similarity between the first collection of map features and the second collection of map features, the first map similarity score being based on the level of similarity.

3. The computer-implemented method of claim 2, wherein at least one of the first collection or the second collection includes at least one of a road feature, a water feature, a landform feature, a landmark feature, or a border feature.

4. The computer-implemented method of claim 1, wherein the first set is preset to be identified for representing the first geographic portion of the particular region.

5. The computer-implemented method of claim 1, wherein at least one map portion in the first set is acquired, for generating the map, at a same time as at least one map portion in the second set.

6. The computer-implemented method of claim 1, further comprising:
   modifying a first style associated with the first set and a second style associated with the second set such that the first style matches, within an allowable deviation, the second style.

7. The computer-implemented method of claim 1, further comprising:
   blending one or more first graphical qualities of at least some map portions in the first set with one or more second graphical qualities of at least some map portions in the second set.

8. The computer-implemented method of claim 1, further comprising:
   dynamically providing first attribution information for the first set and second attribution information for the second set, wherein at least one of the first attribution information or the second attribution information is associated with at least one of a logo, a mark, or a copyright.

9. The computer-implemented method of claim 1, wherein the request further includes at least one of current location information or language information, wherein the at least one of the current location information or the language information is associated with a device that provides the request, and wherein at least one of the first set or the second set is identified further based on the at least one of the current location information or the language information.

10. A system comprising:
    at least one processor; and
    a memory storing instructions that, when executed by the at least one processor, cause the system to perform:
       acquiring a request for a map of a particular region;
       identifying, based on the particular region, a first set of one or more map portions for representing a first geographic portion of the particular region, the first set being associated with a first map data source;
       identifying, based on the particular region, a second set of one or more map portions for representing a second geographic portion of the particular region, the second set being associated with a second map data source;
       modifying at least one of a brightness or a color of the second set based on a brightness or a color of the first set; and
       generating the map of the particular region based on a combination of the first set and the second set, wherein
       the first geographic portion represents a first geographic area within the particular region;
       the second geographic portion represents a second geographic area within the particular region that is adjacent to the first geographic area; and
       the identifying, based on the particular region, the first set of one or more map portions further comprises:
          calculating a first map similarity score based on comparing the first set of one or more map portions with one or more recognized map portions associated with a recognized map data source, the one or more recognized map portions representing the first geographic portion of the particular region;

calculating a second map similarity score based on comparing a third set of one or more map portions with the one or more recognized map portions, the third set representing the first geographic portion of the particular region; and selecting the first set instead of the third set based on a determination that the first map similarity score is greater than the second map similarity score.

11. The system of claim 10, wherein calculating the first map similarity score based on comparing the first set with the one or more recognized map portions further comprises:

acquiring a first collection of map features from the first set;

acquiring a second collection of map features from the one or more recognized map portions; and determining a level of similarity between the first collection of map features and the second collection of map features, the first map similarity score being based on the level of similarity.

12. The system of claim 10, wherein at least one map portion in the first set is acquired, for generating the map, at a same time as at least one map portion in the second set.

13. The system of claim 10, wherein the instructions cause the system to further perform:

modifying a first style associated with the first set and a second style associated with the second set such that the first style matches, within an allowable deviation, the second style.

14. A non-transitory computer-readable storage medium including instructions that, when executed by at least one processor of a computing system, cause the computing system to perform a method comprising:

acquiring a request for a map of a particular region;

identifying, based on the particular region, a first set of one or more map portions for representing a first geographic portion of the particular region, the first set being associated with a first map data source;

identifying, based on the particular region, a second set of one or more map portions for representing a second geographic portion of the particular region, the second set being associated with a second map data source;

modifying at least one of a brightness or a color of the second set based on a brightness or a color of the first set; and generating the map of the particular region based on a combination of the first set and the second set, wherein the first geographic portion represents a first geographic area within the particular region;

the second geographic portion represents a second geographic area within the particular region that is adjacent to the first geographic area; and the identifying, based on the particular region, the first set of one or more map portions further comprises:

calculating a first map similarity score based on comparing the first set of one or more map portions with one or more recognized map portions associated with a recognized map data source, the one or more recognized map portions representing the first geographic portion of the particular region;

calculating a second map similarity score based on comparing a third set of one or more map portions with the one or more recognized map portions, the third set representing the first geographic portion of the particular region; and selecting the first set instead of the third set based on a determination that the first map similarity score is greater than the second map similarity score.

15. The non-transitory computer-readable storage medium of claim 14, wherein calculating the first map similarity score based on comparing the first set with the one or more recognized map portions further comprises:

acquiring a first collection of map features from the first set;

acquiring a second collection of map features from the one or more recognized map portions; and determining a level of similarity between the first collection of map features and the second collection of map features, the first map similarity score being based on the level of similarity.

16. The non-transitory computer-readable storage medium of claim 14, wherein at least one map portion in the first set is acquired, for generating the map, at a same time as at least one map portion in the second set.

17. The non-transitory computer-readable storage medium of claim 14, wherein the instructions cause the computing system to further perform:

modifying a first style associated with the first set and a second style associated with the second set such that the first style matches, within an allowable deviation, the second style.

* * * * *